(No Model.)
J. B. SCANTLIN.
CULTIVATOR.
No. 351,343. Patented Oct. 19, 1886.
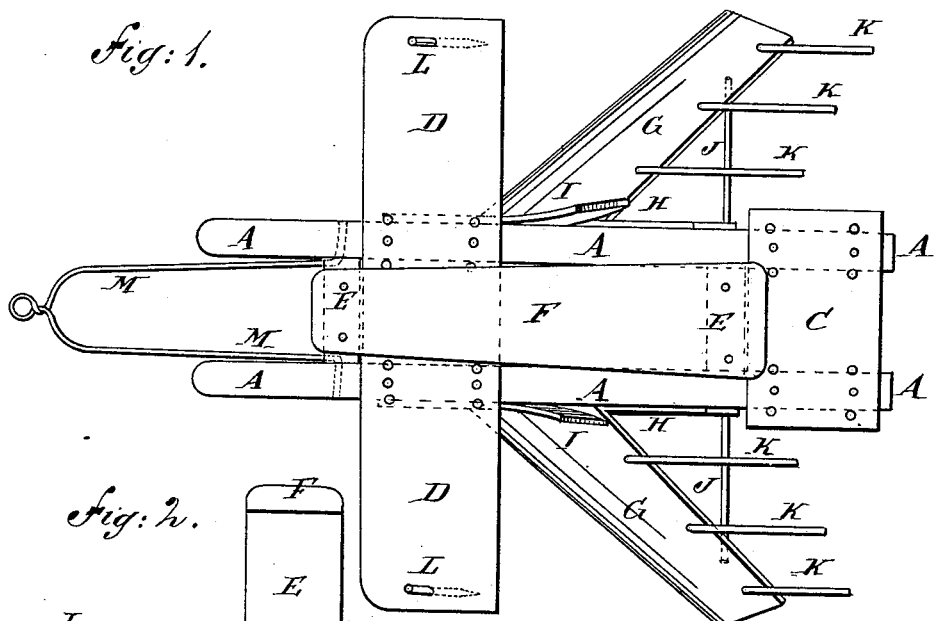
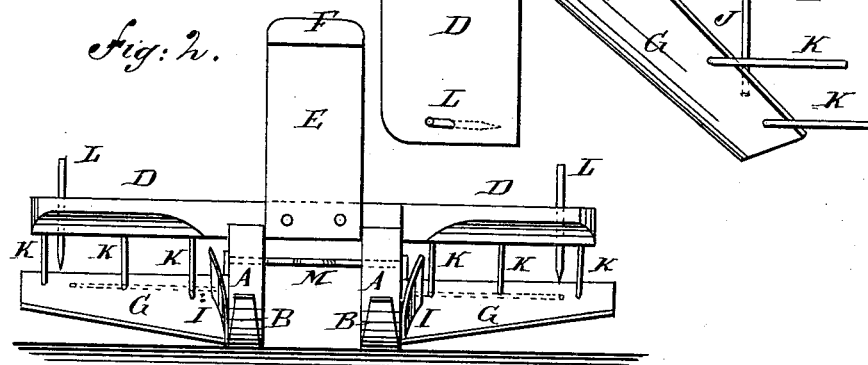
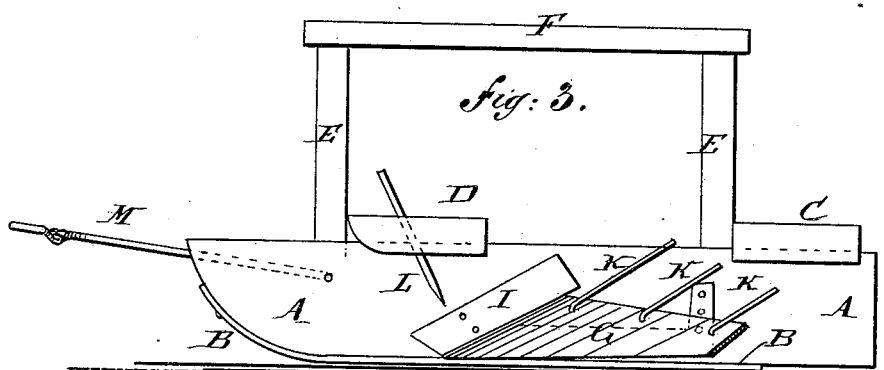
WITNESSES:
Anas. Nida
C. Sedgwick
INVENTOR:
J. B. Scantlin
BY Munn & Co.
ATTORNEYS.

UNITED STATES PATENT OFFICE.

JAMES BUCHANAN SCANTLIN, OF FAIRVIEW, KANSAS.

CULTIVATOR.

SPECIFICATION forming part of Letters Patent No. 351,343, dated October 19, 1886.

Application filed July 17, 1886. Serial No. 208,304. (No model.)

*To all whom it may concern:*

Be it known that I, JAMES BUCHANAN SCANTLIN, of Fairview, in the county of Brown and State of Kansas, have invented a new and useful Improvement in Cultivators, of which the following is a full, clear, and exact description.

Reference is to be had to the accompanying drawings, forming a part of this specification, in which similar letters of reference indicate corresponding parts in all the figures.

Figure 1 is a plan view of my improved cultivator. Fig. 2 is a front elevation of the same. Fig. 3 is a side elevation of the same.
The object of this invention is to provide cultivators for plants planted in rows in fields, nurseries, and gardens, and which shall be simple in construction, convenient in use, and effective in operation, cutting up all the grass and weeds between the rows and leaving them upon the top of the ground to be killed by the sun.

The invention consists of the construction and combination of the various parts of the cultivator, as will be hereinafter fully described.

A are two parallel runners, the lower edges of which are provided with metal shoes or facing-plates B, to prevent them from being worn too rapidly by the friction of the soil. The runners A are connected at their rear ends by a short cross-bar, C, and at a little distance from their forward ends by a long cross-bar, D, secured to their upper edges.
Several holes are formed in the cross-bars C D, to receive the fastening screws or bolts, so that the runners A can be adjusted at a greater or less distance apart, as may be desired. To the forward edges of the middle parts of the cross-bars C D are attached the lower ends of uprights E, to the upper ends of which are attached the end parts of a board, F, to serve as a seat for the driver.

G are two inclined steel plates forming sweeps or shares, and having at their forward ends landsides H, projecting to the rear of the said ends, and forwardly-projecting plates I, to serve as colters when the shares G are adjusted below the level of the faces of the runners A. The rear ends of the shares G and landsides H are connected by braces J, to support the rear ends of the said shares against the resistance of the soil.

The colters I and the rear ends of the landsides H, or of lugs attached to or formed upon the said rear ends, are provided with several holes to receive the fastening screws or bolts, so that the shares can be adjusted at an upward inclination for cultivating listed plants, or at a downward inclination for cultivating plants planted upon ridges, or in a horizontal position for cultivating plants planted upon a level, and also adjusted to work at any desired distance below the surface of the ground.

To the rear parts of the shares G are attached the forward ends of parallel rods K, which project to the rearward with a slight upward inclination. The rods K serve as separators for weeds, grass, and other trash passing over the shares G to slide over, while the soil falls through the spaces between the said rods, so that the said trash will fall upon the top of the soil to be dried up and killed by the sun.

To the outer ends of the forward cross-bar, D, are attached knives or colters L, projecting downward and rearward to serve as colters to separate the weeds and trash in the paths of the shares G from the weeds and trash outside of the said paths, so that all the weeds cut by the said shares will pass over them without being entangled with the uncut weeds.

To the inner sides of the forward parts of the runners A are pivoted the ends of a bail, M, in the center of which is formed an eye for the attachment of the draft.

Having thus described my invention, what I claim as new, and desire to secure by Letters Patent, is—

1. In a cultivator, the combination, with the runners A, connected by cross-bars C D, of the shares G, having landsides H and colters I, and provided with separating-rods K, substantially as herein shown and described, whereby the trash at the sides of the rows will be cut, separated from the soil, and left upon the top of the ground, as set forth.

2. In a cultivator, the combination, with the runners A, the shares G, attached to the said runners, and the projecting ends of the cross-bar D, also attached to the said runners, of the rearwardly-inclined knives or colters L, substantially as herein shown and described, whereby the trash in the paths of the said shares is separated from the trash outside of the said paths, as set forth.

JAMES BUCHANAN SCANTLIN.

Witnesses:
THOMAS J. SEWELL,
FRED. M. LYMAN.